Feb. 20, 1923.
E. M. REITAN.
MILK RECORD SHEET HOLDER.
FILED FEB. 6, 1922.
1,445,912.
2 SHEETS—SHEET 1.
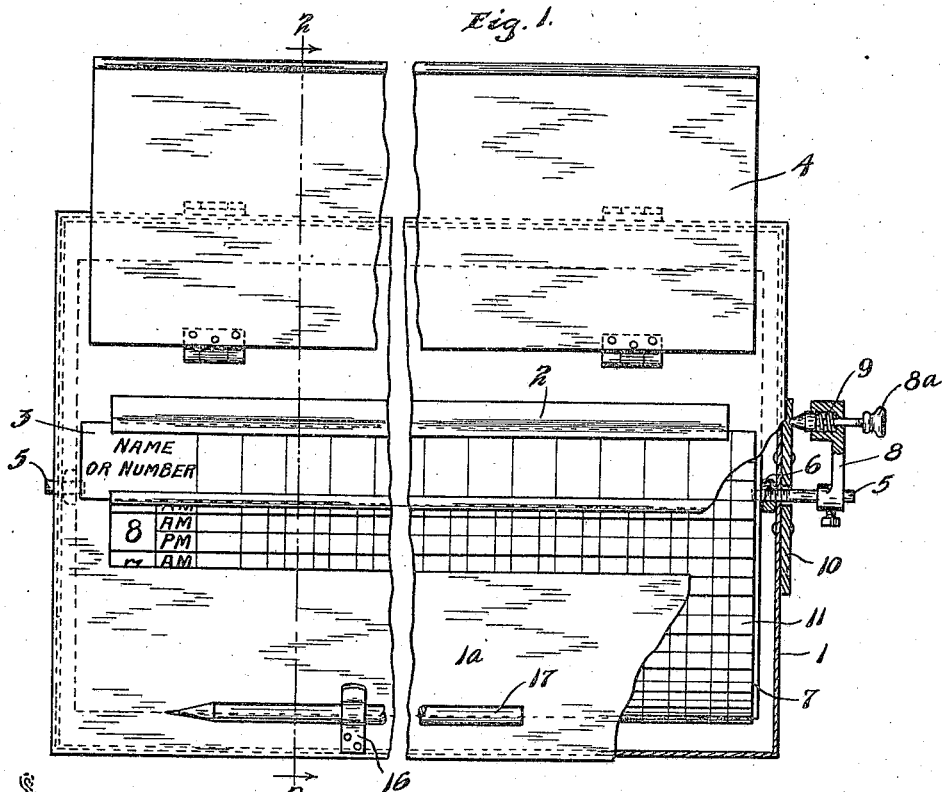
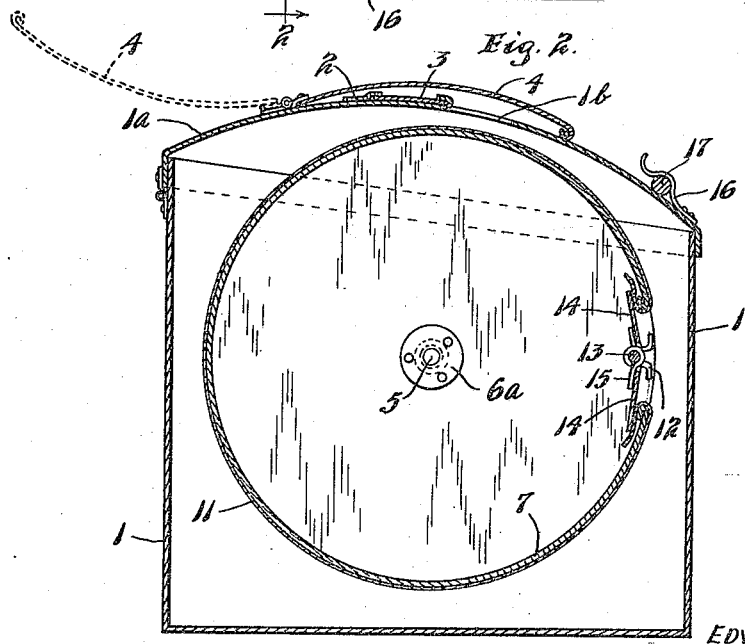
INVENTOR.
EDWARD M. REITAN.
BY HIS ATTORNEY.

Feb. 20, 1923.
E. M. REITAN.
MILK RECORD SHEET HOLDER.
FILED FEB. 6, 1922.
1,445,912.
2 SHEETS—SHEET 2.
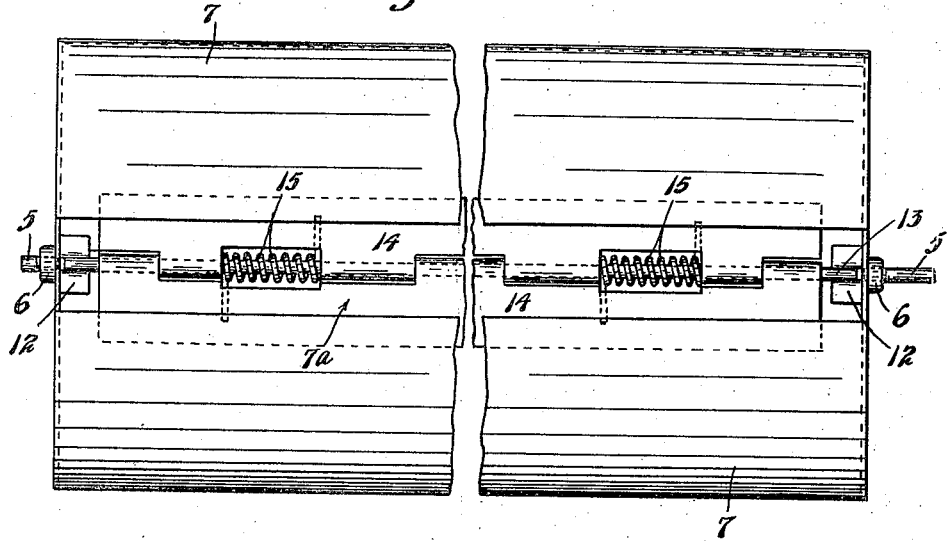
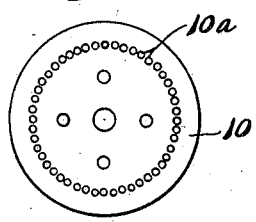
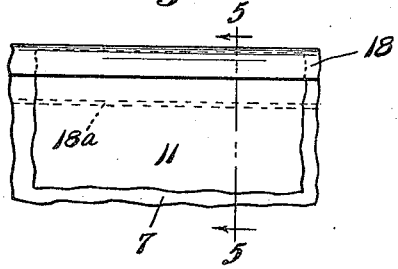
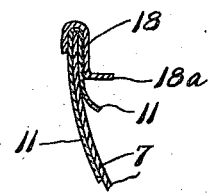
INVENTOR.
EDWARD M. REITAN
BY HIS ATTORNEY.
James F. Williamson Patented Feb. 20, 1923.

1,445,912

UNITED STATES PATENT OFFICE.

EDWARD M. REITAN, OF WEBSTER, WISCONSIN, ASSIGNOR OF ONE-HALF TO JOHN A. MOREN, OF WEBSTER, WISCONSIN.

MILK-RECORD-SHEET HOLDER.

Application filed February 6, 1922. Serial No. 534,303.

*To all whom it may concern:*

Be it known that I, EDWARD M. REITAN, a citizen of the United States, residing at Webster, in the county of Burnett and State of Wisconsin, have invented certain new and useful Improvements in Milk-Record-Sheet Holders; and I do hereby declare the following to be a full, clear, and exact description of the invention, such as will enable others skilled in the art to which it appertains to make and use the same.

This invention relates to a recording device adapted to keep a detailed record of incidents in connection with a large number of persons or animals. The device is particularly designed and adapted to record the quantity of milk obtained from the individual cows of a herd. In a great many of the States there are, at present, dairy associations and it is the rule with most of these associations that each member shall keep an accurate record of the milk produced by each cow of his herd, which record is to be entered at each milking period. The keeping of a record about a stable or barn is, of course, a rather difficult matter if the record sheet is unprotected as the same will soon be so soiled by the dirt of the barn and the soiled hands of the person working therein and be so torn and worn that the entries thereon would be undiscernible.

It is an object of this invention, therefore, to provide a simple device for carrying and manipulating the record sheet as well as protecting the same.

It is a further object of the invention to provide such means which can be easily manipulated, conveniently read and one in which the record sheet may be easily and quickly inserted or removed, as desired.

It is still another object of the invention to provide a simple, efficient and easily operated means for holding the record sheet in place.

These and other objects of the invention will fully appear from the following description made in connection with the accompanying drawings in which like reference characters refer to the same parts throughout the different views, and in which, Fig. 1 is a top plan view of the device, a small portion being shown in section;

Fig. 2 is a vertical section taken on the line 2—2 of Fig. 1, as indicated by the arrows;

Fig. 3 is a plan view of the cylinder of the device;

Fig. 4 is a plan view of the plate used on the end of the casing; and

Figs. 5 and 6 are, respectively, a partial view in side elevation and a vertical section on the line 5—5 of Fig. 5, of a modified structure for holding the record sheet.

Referring to the drawings, the device comprises a casing 1 having its bottom, sides and ends of rectangular form and having a curved top portion $1^a$ hinged to the rear side near the top thereof. This top portion, as clearly shown in Fig. 2, overlaps the other portion of the casing, thus forming a tight moisture proof closure. The top portion $1^a$ has adjacent the center thereof, a narrow longitudinal opening $1^b$, one edge of which is turned outwardly to form a groove. A plate 2 is secured to the top a short distance from this edge and is bent at one edge to be spaced from the top to form an opposing groove. These grooves form a guide channel adapted to receive and hold in place a designating card or paper strip 3 which is thus disposed closely adjacent the opening $1^b$. The top $1^a$ has also hinged thereto a cover member 4 adapted to swing over and cover the opening $1^b$.

The ends of the casing 1 are provided at a point substantially at the center thereof with openings forming the bearings for shafts 5, which shafts are threaded into bosses 6 extending through the ends of a cylinder member 7. The bosses 6 have flanges $6^a$ thereon disposed at the inside of the cylinder ends and riveted thereto, as shown in Fig. 2. The cylinder 7 is thus revolubly supported in the casing 1 and a crank member 8 is secured by a set screw or other suitable means to the projecting end of one of the shafts 5 and this crank has a handle portion $8^a$ extending through its outer end, the inner end of this portion being enlarged and pressed upon by a coiled spring 9 disposed about the member $8^a$ and carried in a chamber in said crank. The inner portion of the handle member $8^a$ is of conical or pointed shape and is thus urged into engagement with a circular plate 10 rigidly secured on the outside of the casing end about the shaft 5, which plate has a multiplicity of circumferentially arranged and closely spaced indentations 10ª with which the pointed end of the crank handle 8ª engages. With this construction, the cylinder can be turned by the crank 8 and held in any one of a large number of positions. The cylinder 7 is adapted to carry a record sheet 11 on its exterior surface and the cylinder is formed with a somewhat narrow longitudinally extending opening 7ª. U-shaped bearings 12 are secured at each end of the cylinder 7 adjacent the ends thereof and substantially centrally of the opening 7ª and a rod 13 has its ends resting in these bearings and extends lengthwise of the opening 7ª. Oppositely directed wing plates 14 have spaced lugs pivotally engaging this rod in alternate relation and also have cutaway portions at two points to accommodate coiled springs 15 coiled about the rods and which have their end portions extending in opposite directions in engagement with the inner surface of said wing plates. The edges of the cylinder at the opening 7ª are bent inwardly to form a smooth edge or bead and the inner edges of the wing plates are urged by the springs 15 into contact therewith. The plates thus react against the rod 13 to hold the same in the bottom of the U-shaped bearings 12.

The casing 1 is also provided on its top portion with a pencil-holding clamp 16 adapted to hold a pencil or other writing implement 17.

When the device is used to keep a milk record, the designating sheet 3 will have thereon the name or number of each cow in the individual space indicated thereon, the vertical lines forming these spaces on this designated sheet 3 being alined with the vertical lines on the record sheet 11, a small portion of which will be visible through the opening 7ª. This record sheet 11 will have the days of the month and has horizontal lines designating the a. m. and p. m. milking times. In using the device, as each cow is milked the milk will be weighed or measured and the proper entry made on the record sheet 11 at the proper places. By having only a small portion of the sheet 11 visible it is not necessary to locate the name or number of the cow and then follow the column down over a long sheet, as would be the case if the whole sheet were exposed. The operator simply turns the cylinder to bring the space for each day opposite the opening 7 and the designation for the individual cow is thus brought closely adjacent the place of entry and the chance of error in making the entry is practically eliminated. The record sheet is protected by the casing both from moisture and from being soiled by the dirt of the stable or the hands of the workmen, it being noted that the hands need never come into contact with the sheet, except when the same is placed on or removed from the cylinder 7.

To place the record sheet on the cylinder, the same is properly located endwise thereof and one edge folded around one edge of the opening 7ª. The wing plates 14 can be very easily pushed in by the fingers and after the sheet is in place, allowed to come in contact with the edge thereof, as shown in Fig. 2. The cylinder is then turned to wrap the sheet around the same and the other end edge is, likewise, turned over the edge of 7ª and the wing plate 14 allowed to contact therewith. If desired, the wing plates 14 and rod 13 can be readily removed from the cylinder. When the device is not being used to make a record the hinge cover 4 swings over the opening 1ᵇ and the casing 1 is entirely closed and the record and designating strip entirely protected.

In the modification shown in Figs. 5 and 6, the parts 12 to 15 are omitted and a clamp 18 of the resilient metal is merely pushed over the edge of the opening 7ª in contact with the record sheet 11 to hold the edges thereof in place, the clamp 18 being formed with a projecting inner edge 18ª for easy manipulation thereof.

From the above description it is seen that applicant has provided an extremely simple and efficient device particularly adapted for use on dairy farms. The same can be inexpensively made, is very easily operated and will require practically no attention for maintenance or repair. The device is preferably made of sheet iron which will be suitably coated or painted to protect the same from the weather and from corrosion.

It will, of course, be understood that various changes may be made in the form, details and proportions of the parts without departing from the scope of applicant's invention, which, generally stated, consists in the matter shown and described and set forth in the appended claims.

What is claimed is:

1. In a device of the class described, a revoluble cylinder having a longitudinal opening in the sides thereof, means for holding a record sheet on the exterior surface of said cylinder, comprising a rod extending longitudinally across said opening, and springpressed wings pivoted on said rod and pressing against the inner edges of said opening to hold the ends of the sheet which are folded over said edges.

2. A device of the class described having in combination a casing, a revolvable cylinder mounted therein, said cylinder having a longitudinal opening in the side thereof, U-shaped bearings secured to the interior of the cylinder ends adjacent said opening and substantially centrally thereof, a rod journaled in said bearings, oppositely disposed wing plates journaled on said rod, coiled springs on said rod pressing said wing plates outwardly, the edges of said plates contacting the inner edges of the opening in said cylinder and re-acting thereagainst to hold said rod in said bearings.

3. In a device of the class described, a revoluble cylinder adapted to carry a record sheet on its exterior surface, said cylinder having a longitudinal slot therethrough, the edges of which are inturned, a rod supported in said cylinder and extending longitudinally of said slot, oppositely disposed wings hinged on said rod and coiled springs on said rod engaging said wings to hold them against said inturned edges and hold the ends of the record sheet therebetween.

In testimony whereof I affix my signature.

EDWARD M. REITAN.

Witnesses:
BERTHA WAGNER.
ESTHER BORGMAN.